United States Patent
Yang

(10) Patent No.: US 11,082,940 B2
(45) Date of Patent: Aug. 3, 2021

(54) UPLINK TIMING ADJUSTMENT METHOD AND TERMINAL

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 210 days.

(21) Appl. No.: 16/337,821

(22) PCT Filed: Mar. 21, 2017

(86) PCT No.: PCT/CN2017/077559
§ 371 (c)(1),
(2) Date: Mar. 28, 2019

(87) PCT Pub. No.: WO2018/170743
PCT Pub. Date: Sep. 27, 2018

(65) Prior Publication Data
US 2020/0015184 A1   Jan. 9, 2020

(51) Int. Cl.
*H04W 56/00* (2009.01)
*H04W 16/14* (2009.01)
*H04W 74/08* (2009.01)

(52) U.S. Cl.
CPC ....... *H04W 56/0045* (2013.01); *H04W 16/14* (2013.01); *H04W 56/0055* (2013.01); *H04W 74/0833* (2013.01)

(58) Field of Classification Search
CPC ............. H04W 56/0045; H04W 56/00; H04W 56/0055; H04W 16/14; H04W 74/0833
(Continued)

(56) References Cited

U.S. PATENT DOCUMENTS

| 8,989,128 B2 | 3/2015 | Dinan | |
| 2015/0098400 A1* | 4/2015 | Lee | H04W 56/0045 370/329 |

(Continued)

FOREIGN PATENT DOCUMENTS

| CN | 103597765 | 2/2014 |
| CN | 104640118 | 5/2015 |

(Continued)

OTHER PUBLICATIONS

WIPO, ISR for PCT/CN2017/077559, Dec. 5, 2017.
(Continued)

*Primary Examiner* — Rownak Islam
(74) *Attorney, Agent, or Firm* — Hodgson Russ LLP

(57) ABSTRACT

Embodiments of an uplink timing adjustment method and a terminal are disclosed. The method includes: when a Time Alignment Timer TAT corresponding to a first Timing Advance adjustment Group TAG fails, requesting, by a terminal, a serving cell corresponding to a second TAG to coordinate uplink timing of a serving cell corresponding to the first TAG; receiving, by the terminal, a Timing Advance Command TAC corresponding to the first TAG; and adjusting, by the terminal, the uplink timing of the serving cell corresponding to the failed first TAG according to the TAC corresponding to the first TAG.

14 Claims, 4 Drawing Sheets

(58) Field of Classification Search
USPC .......................................................... 370/350
See application file for complete search history.

(56) References Cited

U.S. PATENT DOCUMENTS

2016/0044617 A1    2/2016  Vajapeyam et al.
2016/0345316 A1*  11/2016  Kazmi .............. H04W 74/0833

FOREIGN PATENT DOCUMENTS

| CN | 106060919  | 10/2016 |
| EP | 2709292    | 3/2014  |
| WO | 2014114261 | 7/2014  |

OTHER PUBLICATIONS

CNIPA, First Office Action for CN Application No. 201780082485.5, dated Nov. 28, 2019.
EPO, Office Action for EP Application No. 17901464.2, dated Oct. 2, 2019.

* cited by examiner

UPLINK TIMING ADJUSTMENT METHOD AND TERMINAL

CROSS-REFERENCE TO RELATED APPLICATION

This application is a U.S. national phase application of International Application No. PCT/CN2017/077559, filed Mar. 21, 2017, the entire disclosure of which is incorporated herein by reference.

TECHNICAL FIELD

The present disclosure relates to communications technologies, and in particular, to an uplink timing adjustment method and a terminal.

BACKGROUND

In a long term evolution (LTE) communication system, uplink time alignment is necessary. As shown in FIG. 1, it is assumed that one serving cell has two terminals: a terminal 1 and a terminal 2. The terminal 1 is closer to a base station, and the signal propagation delay to the base station is d1. The terminal 2 is at the edge of the serving cell, and the signal propagation delay to the base station is d2. It is also assumed that each terminal has only one carrier connection (i.e., a scenario of carrier aggregation (CA) or dual connectivity (DC) is not considered). Obviously, because the terminal 1 is closer to the base station than the terminal 2, d1<d2. In this hypothetical scenario, if uplink time alignment (i.e., uplink synchronization) is not performed, situations shown in FIG. 2 occur: (1) since the propagation delays of the terminal 1 and the terminal 2 to the base station are different, it can be seen from equipment in a network side that the arrival times of the uplink signal are also different; (2) it is assumed that a scheduled sub-frame for terminal 2 is SF1 and a scheduled sub-frame for terminal 1 is SF2, since the arrival times of the uplink signals are inconsistent, a later signal part of terminal 2 and a former signal part of terminal 1 may interfere with each other. It can be seen from above that the uplink time alignment is necessary.

The uplink time alignment can also be understood as the uplink synchronization, which is different from downlink synchronization (in the LTE communication system, the downlink synchronization refers to that the terminal monitors the primary synchronization signal (PSS)/secondary synchronization signal (SSS) to obtain downlink timing). In the LTE communication system, the terminal needs to communicate with the equipment in the network side, and one of necessary steps is to obtain uplink synchronization through a random access (RA) process. Specifically, the terminal sends the MSG1 that is, the random access preamble (RA preamble) to the network side device through the RA (the open-loop power control, the procedure in which terminal gradually increases the power probe), the network side device estimates offset of the uplink timing after receiving the preamble; the network side device sends the uplink timing adjustment amount to the terminal in MSG2 of the RA (a response ACK sent by the ENB at a certain time after ENB receives a MSG1 response). The adjustment amount of the uplink timing is always based on the downlink timing, that is, the terminal needs to obtain the downlink timing through the PSS/SSS first, and then adjust the uplink time by the adjustment amount of the uplink time sent by the network side device.

As shown in FIG. 3, in the LTE communication system, a network side device can send a Timing Advance Command (TAC) to the terminal in two ways: one way is to send the TAC in a Random Access Response (RAR), and the other way is to send the TAC in a MAC Control Element (MAC CE), as shown in FIG. 3. Sending the TAC through the RAR generally occurs when the terminal performs initial access, handover, or radio link failure (RLF), etc., to obtain an initial adjustment amount of the uplink time. Sending the TAC through the MAC CE generally occurs when the terminal has an RRC connection, so that the network side device can transmit adjustment amount of the uplink time through the uplink data.

The network side device configures a Time Alignment Timer (TAT) for the terminal, and the terminal determines how long the alignment state can last according to the TAT. The triggering or retriggering of the TAT is generally performed by the terminal receiving the TAC, and the duration of the TAT is configured by the network side device. If the terminal does not receive the TAC within the duration of the TAT, the uplink synchronization is considered as lost. If the uplink synchronization is lost, the terminal needs to clear all HARQ buffers, and release PUCCH resources or the like. If the uplink synchronization needs to be re-obtained, the terminal needs to initiate the random access procedure again.

In addition, in the scenario where the terminal supports multiple connections (multiple connections can be implemented by carrier aggregation (CA) or dual connectivity (DC)), there is a situation where uplink synchronization of one connection is lost (such as no data reception/transmission within the duration of the TAT), but another connection still remains uplink synchronization. In this case, the connection that loses the uplink synchronization (if it is the primary serving cell (PCell)) clears all Physical Uplink Control Channel (PUCCH) resources or clears Hybrid Automatic Repeat Request (HARQ) buffer, and this may cause that the another connection that still retains upstream synchronization to be unavailable.

SUMMARY

Embodiments of the present disclosure provide an uplink timing adjustment method and a terminal, so as to obtain a timing advance command TAC through a synchronous connection to adjust another connection for which the uplink synchronization is lost, thereby saving the overhead of random access resources.

In a first aspect, an embodiment of the present disclosure provides an uplink timing adjustment method, including:

when a Time Alignment Timer TAT corresponding to a first Timing Advance adjustment Group TAG fails, requesting, by a terminal, a serving cell corresponding to a second TAG to coordinate uplink timing of a serving cell corresponding to the first TAG;

receiving, by the terminal, a Timing Advance Command TAC corresponding to the first TAG; and adjusting, by the terminal, the uplink timing of the serving cell corresponding to the failed first TAG according to the TAC corresponding to the first TAG.

In the embodiment of the present disclosure, when the TAT corresponding to the first TAG fails, the terminal requests the serving cell corresponding to the second TAG to coordinate the uplink timing of the serving cell corresponding to the first TAG. Secondly, the terminal receives the TAC corresponding to the second TAG. Finally, the terminal adjusts the uplink timing of the serving cell corresponding to the failed first TAG according to the TAC corresponding to the second TAG. The terminal adjusts the uplink timing of the serving cell corresponding to the first TAG which loses uplink synchronization through the TAC corresponding to the second TAG, which prevents the terminal from initiating a random access procedure when the TAT corresponding to the first TAG fails and can save the overhead of random access resources.

In a possible design, after the terminal adjusts the uplink timing of the serving cell corresponding to the failed first TAG, the method further includes:

re-triggering the TAT corresponding to the first TAG by the terminal.

In a possible design, the second TAG is a TAG of a first Media Access Control MAC entity to which the first TAG belongs; a serving cell set corresponding to the first TAG and a serving cell set corresponding to the second TAG transmit data to the terminal by means of carrier aggregation CA; the first TAG and the second TAG are managed by the first Media Access Control MAC entity, and a TAG ID of the first TAG and a TAG ID of the second TAG are allocated by the first MAC entity.

In a possible design, the second TAG is a TAG of a second MAC entity, and the second MAC entity is different from the first MAC entity to which the first TAG belongs; a serving cell set corresponding to the first TAG and a serving cell set corresponding to the second TAG transmit data to the terminal by means of dual connectivity DC, the first TAG is managed by the first MAC entity, and the second TAG is managed by the second MAC entity; the TAG ID of the first TAG is allocated by the first MAC entity, and the TAG ID of the second TAG is allocated by the second MAC entity; each of the first MAC entity and the second MAC entity corresponds to multiple TAGs, and the multiple TAGs include one pTAG or one pTAG and at least one sTAG.

In one possible design, the method further includes:

triggering the TAT of the first TAG by the terminal.

In the present example, triggering the TAT of the first TAG by the terminal include:

receiving the TAC sent by a first serving cell and triggering the TAT of the first TAG by the terminal; wherein the first serving cell is a serving cell of the first MAC entity corresponding to the TAG except the first TAG, and the TAC includes the TAG ID of the first TAG and the TAG ID of the TAG other than the first TAG; or receiving the TAC sent by a second serving cell and triggering the TAT of the first TAG by the terminal; wherein the second serving cell is a serving cell corresponding to the TAG of the second MAC entity, and the second MAC entity is different from the first MAC entity, the TAC includes an ID of the second MAC entity, an ID of the first MAC entity, and the TAG ID of the first TAG.

In a possible design, requesting, by the terminal, the serving cell corresponding to a second TAG to coordinate uplink timing of the serving cell corresponding to the first TAG includes:

sending, by the terminal, an alignment command for coordinating uplink timing to the serving cell corresponding to the second TAG.

In a possible design, after the terminal sends alignment command for coordinating uplink timing to the serving cell corresponding to the second TAG, the method further includes:

receiving, by the terminal, a random access preamble allocated by the serving cell corresponding to the second TAG; wherein the random access preamble is allocated after the serving cell corresponding to the second TAG receives the alignment command for coordinating uplink timing.

In a possible design, after the terminal receives the random access preamble allocated by the serving cell corresponding to the second TAG, the method further includes:

initiating, by the terminal, a random access procedure by using the random access preamble; and receiving, by the terminal, a random access response sent by the serving cell corresponding to the first TAG and obtaining an uplink timing adjustment amount.

In a second aspect, an embodiment of the present disclosure provides a terminal, wherein the terminal has functions of realizing behaviors of the terminal designed by the above methods. The functions may be implemented by hardware or by execution of software through the hardware. The hardware or software includes one or more modules corresponding to the functions described above.

In one possible design, the terminal includes a processor configured to support corresponding functions of the above methods performed by the terminal. Further, the terminal may further include a transceiver configured to support communications between the terminal and the network side device. Further, the terminal may further include a memory configured to be coupled with the processor and store program instructions and data necessary for the terminal.

In a third aspect, an embodiment of the present disclosure provides a computer readable storage medium, wherein the computer readable storage medium stores instructions. When the instructions run on a computer, the computer is caused to perform the methods described in the first aspect above.

In a fourth aspect, an embodiment of the present disclosure provides a computer program product including instructions. When the instructions run on a computer, the computer is caused to perform the method described in the first aspect above.

In the embodiment of the present disclosure, when the TAT corresponding to the first TAG fails, the terminal requests the serving cell corresponding to the second TAG to coordinate the uplink timing of the serving cell corresponding to the first TAG. Secondly, the terminal receives the TAC corresponding to the second TAG. Finally, the terminal adjusts the uplink timing of the serving cell corresponding to the failed first TAG according to the TAC corresponding to the second TAG. Terminal adjusts the uplink timing of the serving cell corresponding to the first TAG which loses uplink synchronization through the TAC corresponding to the second TAG, which prevents the terminal from initiating a random access procedure when the TAT corresponding to the first TAG fails and saves the overhead of random access resources.

BRIEF DESCRIPTION OF THE DRAWINGS

The drawings used in the embodiments or the description of the prior art will be briefly described below.

DETAILED DESCRIPTION

The technical solutions in the embodiments of the present disclosure will be described below with reference to the drawings.

Figure 1:
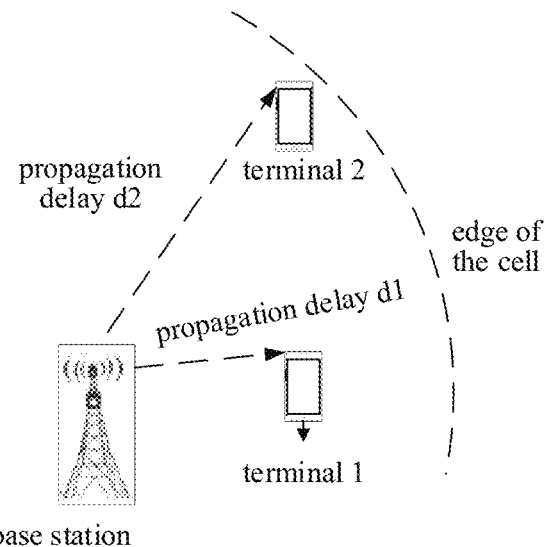
FIG. 1 is an example communication serving cell scenario of a plurality of terminals in an existing LTE communication system.
Figure 2:
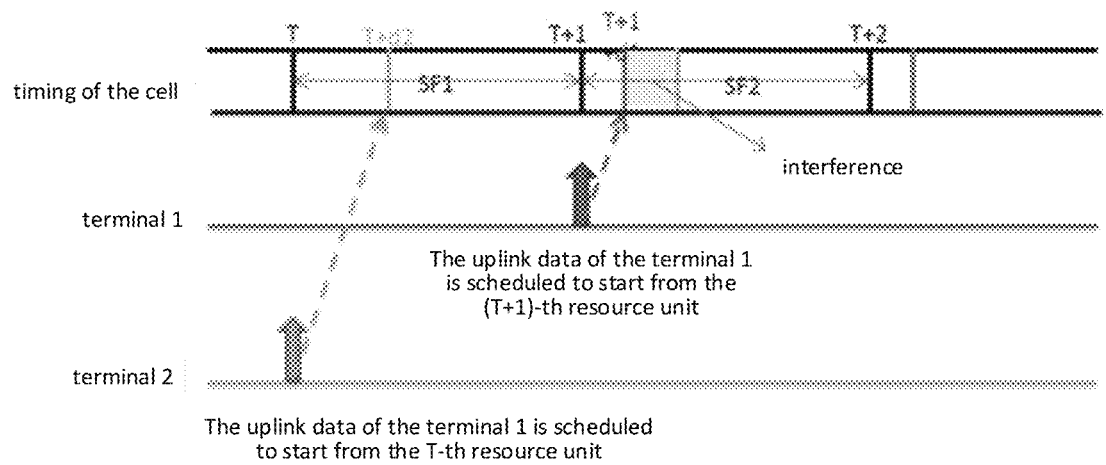
FIG. 2 is a schematic diagram of time interference of uplink signals when propagation delays of a plurality of terminals are different in an existing LTE communication system.
Figure 3:
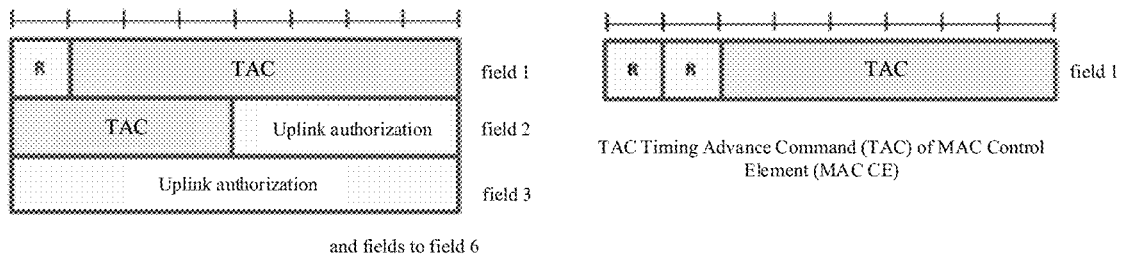
FIG. 3 is a schematic diagram of a network side device transmitting a TAC to a terminal in an existing LTE communication system.
Figure 4:
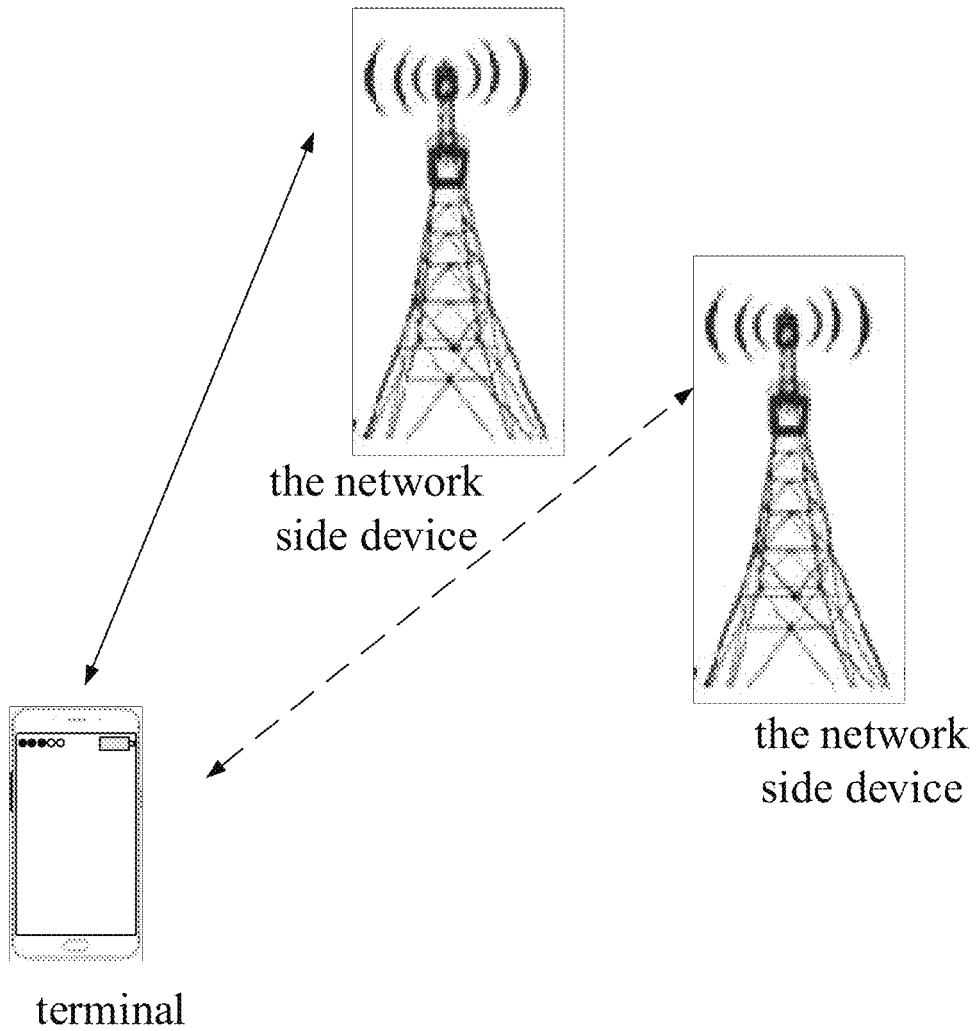
FIG. 4 is a schematic diagram of a network architecture of an example communication system according to an embodiment of the present disclosure.

FIG. 4 is a possible network architecture of an example communication system according to an embodiment of the present disclosure. The example communication system may be a 4G LTE communication system or a 5G NR communication system, specifically including a network side device and a terminal. When the terminal accesses a mobile communication network provided by the network side device, communication connection between the terminal and the network side device can be radio link, and the communication connection mode may be a single connection mode, a dual connectivity mode or a multiple connectivity mode. When the communication connection mode is a single connection mode, the network side device may be an LTE base station or an NR base station; when the communication mode is the dual connectivity mode (specifically, the dual connectivity may be implemented by carrier aggregation CA technology, or multiple network side devices) and the terminal is connected to multiple network side devices, the multiple network side devices may be primary base stations MCGs and secondary base stations SCGs, and data transmission is conducted by data backhaul between base stations via backhaul link. The primary base stations may be the LTE base stations, and the secondary base stations may be the LTE base stations; or the primary base stations may be NR base stations, and the secondary base stations may be LTE base stations; or the primary base stations may be NR base stations, and the secondary base stations may be NR base stations. In the embodiments of the present disclosure, the terms "network" and "system" are often used interchangeably, and those skilled in the art can understand the meaning thereof. The terminal involved in the embodiments of the present disclosure may include various handheld devices, in-vehicle devices, wearable devices, computing devices, or other processing devices connected to the wireless modem which have a function of wireless communication, and various forms of user equipment (UE), mobile station (MS), terminal device, and the like. For convenience of description, the devices mentioned above are collectively referred to as terminals.

Figure 5:
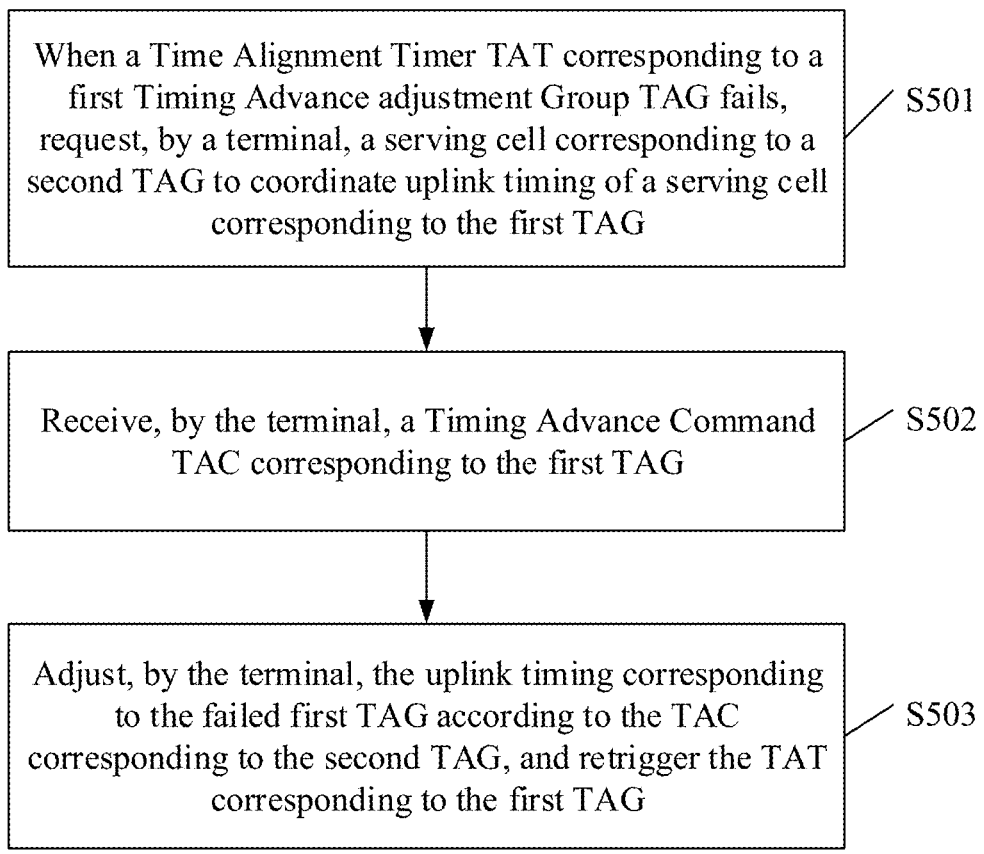
FIG. 5 is a schematic diagram of communication of an uplink timing adjustment method according to an embodiment of the present disclosure.

FIG. 5 is an uplink timing adjustment method according to an embodiment of the present disclosure. The method includes the following steps.

In block S501, when a Time Alignment Timer TAT corresponding to a first Timing Advance adjustment Group TAG fails, a terminal requests a serving cell corresponding to a second TAG to coordinate uplink timing of a serving cell corresponding to the first TAG.

In block S502, the terminal receives a timing advance command TAC corresponding to the first TAG.

Receiving a timing advance command TAC corresponding to the first TAG by the terminal includes:

receiving, by the terminal, the TAC corresponding to the first TAG sent by the serving cell corresponding to the second TAG by the terminal; or receiving, by the terminal, the TAC corresponding to the first TAG sent by a serving cell corresponding to a third TAG; wherein the serving cell corresponding to the third TAG is a serving cell which the serving cell corresponding to the second TAG requests to forward the TAC corresponding to the first TAG.

In block S503, the terminal adjusts the uplink timing of the serving cell corresponding to the failed first TAG according to the TAC corresponding to the first TAG, and retriggers the TAT corresponding to the first TAG.

The time adjustment amounts in the first TAG is the same for different terminals, and the time of the TAT corresponding to the first TAG is used for the terminal(s) to determine whether the uplink is synchronized.

In the embodiment of the present disclosure, when the TAT corresponding to the first TAG fails, the terminal requests the serving cell corresponding to the second TAG to coordinate the uplink timing of the serving cell corresponding to the first TAG. Secondly, the terminal receives the TAC corresponding to the second TAG. Finally, the terminal adjusts the uplink timing of the serving cell corresponding to the failed first TAG according to the TAC corresponding to the second TAG. The terminal adjusts the uplink timing of the serving cell corresponding to the first TAG which loses uplink synchronization through the TAC corresponding to the second TAG, which prevents the terminal from initiating a random access procedure when the TAT corresponding to the first TAG fails and saves the overhead of random access resources.

In a possible example, after the terminal adjusts the uplink timing of the serving cell corresponding to the failed first TAG, the method further includes:

re-triggering the TAT corresponding to the first TAG by the terminal.

In a possible example, the second TAG is a TAG of the first media access control MAC entity to which the first TAG belongs; a serving cell set corresponding to the first TAG and a serving cell set corresponding to the second TAG transmit data to the terminal by means of carrier aggregation CA; the first TAG and the second TAG are managed by the first media access control MAC entity, and a TAG ID of the first TAG and a TAG ID of the second TAG are allocated by the first MAC entity. The serving cell set is a single serving cell or a serving cell group.

In this possible example, requesting, by the terminal, the serving cell corresponding to the second TAG to coordinate uplink timing of the serving cell corresponding to the first TAG includes:

sending, by the terminal, an alignment command for coordinating uplink timing to the serving cell corresponding to the second TAG.

Receiving the timing advance command TAC corresponding to the first TAG by the terminal includes:

receiving, by the terminal, the TAC corresponding to the first TAG sent by the serving cell corresponding to the second TAG; wherein the TAC includes a TAG ID of the first TAG, a TAG ID of the second TAG, and the uplink timing adjustment amount of the serving cell corresponding to the first TAG.

Adjusting an uplink timing of the serving cell corresponding to the failed first TAG by the terminal according to the timing advance command TAC corresponding to the first TAG includes:

adjusting, by the terminal, an uplink timing of the serving cell corresponding to the failed first TAG according to the uplink timing adjustment amount in the TAC.

For example, in a CA scenario, a terminal aggregates two carriers, which correspond to a primary cell (PCell) and a secondary cell (SCell), respectively. For the PCell, the network side device configures the first TAG and the TAT corresponding to the first TAG for the terminal; for the SCell, the network side device configures the second TAG and the TAT corresponding to the second TAG for the terminal. When the PCell has no data transmission and reception for a long time, the TAT corresponding to the first TAG of the PCell fails and the terminal determines that the PCell uplink loses synchronization, but the TAT corresponding to the second TAG of the Scell does not fail. The network side device sends the TAC to the terminal through the SCell, and the TAC includes the TAG ID of the first TAG of the Pcell, the TAG ID of the second TAG of the SCell, and the uplink timing adjustment amount of the PCell. The terminal receives the TAC, adjusts the uplink timing of the Pcell according to the uplink timing adjustment amount, and re-triggers the TAT corresponding to the first TAG of the Pcell.

In a possible example, the second TAG is a TAG of a second MAC entity, and the second MAC entity is different from the first MAC entity to which the first TAG belongs, and the serving cell set corresponding to the first TAG and the serving cell set corresponding to the second TAG transmit data to the terminal by means of dual connectivity DC, the first TAG is managed by the first MAC entity, and the second TAG is managed by the second MAC entity. The TAG ID of the first TAG is allocated by the first MAC entity, and the TAG ID of the second TAG is allocated by the second MAC entity. Each of the first MAC entity and the second MAC entity corresponds to multiple TAGs, and the multiple TAGs include one pTAG or one pTAG and at least one sTAG. The serving cell set is a single serving cell or a serving cell group.

In the present possible example, requesting, by the terminal, the serving cell corresponding to the second TAG to coordinate uplink timing of the serving cell corresponding to the first TAG includes:

sending, by the terminal, an alignment command for coordinating uplink timing to the serving cell corresponding to the second TAG.

Receiving, by the terminal, the timing advance command TAC corresponding to the first TAG includes:

receiving, by the terminal, the TAC corresponding to the first TAG sent by the serving cell corresponding to the second TAG; wherein the TAC includes a TAG ID of the first TAG, a MAC ID of a first MAC entity, a TAG ID of the second TAG and the uplink timing adjustment amount of the serving cell corresponding to the first TAG.

Adjusting, by the terminal, the uplink timing of the serving cell corresponding to the failed first TAG according to the TAC corresponding to the first TAG includes:

adjusting, by the terminal, the uplink timing corresponding to the failed first TAG according to the uplink timing adjustment amount in the TAC.

For example, in a DC scenario, the terminal accesses a master cell group (MCG) and a secondary cell group (SCG) simultaneously through the dual connectivity. For the MCG, the network side device configures the first TAG and the TAT corresponding to the first TAG for the terminal. For the SCG, the network side device configures the second TAG and the TAT corresponding to the second TAG for the terminal. The first TAG is in the first MAC entity corresponding to the MCG, and the second TAG is in the second MAC entity corresponding to the SCG. Since the MCG has no data transmission and reception for a long time, the TAT corresponding to the first TAG of the MCG fails and the terminal determines that the MCG uplink loses synchronization, but the TAT corresponding to the second TAG of the SCG does not fail. The network side device sends the TAC to the terminal through the SCG, and the TAC includes the TAG ID of the first TAG of the MCG, the TAG ID of the second TAG of the SCG, and the uplink timing adjustment amount of the MCG. The terminal receives the TAC, adjusts the uplink timing of the MCG according to the uplink timing adjustment amount, and re-triggers the TAT corresponding to the first TAG of the MCG.

In one possible example, the method further includes:
triggering the TAT of the first TAG by the terminal.
In the present possible example, triggering the TAT of the first TAG by the terminal includes:

receiving, by the terminal, the TAC sent by a first serving cell and triggering the TAT of the first TAG; wherein the first serving cell is a serving cell of the first MAC entity corresponding to a TAG except the first TAG, and the TAC includes the TAG ID of the first TAG and the TAG ID of the TAG other than the first TAG; or receiving, by the terminal, the TAC sent by a second serving cell and triggering the TAT of the first TAG; wherein the second serving cell is a serving cell corresponding to the TAG of the second MAC entity, and the second MAC entity is different from the first MAC entity. The TAC includes an ID of the second MAC entity, an ID of the first MAC entity, and the TAG ID of the first TAG.

The duration of the TAT of the first TAG may be extended according to the TAC, and the extension amount may be configured by the network side device.

In a possible example, requesting, by the terminal, the serving cell corresponding to the second TAG to coordinate uplink timing of the serving cell corresponding to the first TAG includes:

sending, by the terminal, an alignment command for coordinating uplink timing to the serving cell corresponding to the second TAG.

In a possible example, after the terminal sends alignment command for coordinating uplink timing to the serving cell corresponding to the second TAG, the method further includes:

receiving, by the terminal, a random access preamble allocated by the serving cell corresponding to the second TAG; wherein the random access preamble is allocated after the serving cell corresponding to the second TAG receives the alignment command for coordinating uplink timing.

In a possible example, after the terminal receives the random access preamble allocated by the serving cell corresponding to the second TAG, the method further includes:

initiating, by the terminal, a random access procedure by using the random access preamble; and receiving, by the terminal, a random access response sent by the serving cell corresponding to the first TAG and obtaining an uplink timing adjustment amount.

In the present example, when the network has no way to obtain the uplink timing adjustment amount of the serving cell corresponding to the first TAG through the serving cell corresponding to the second TAG, the network can send a preamble to the terminal through the second TAG. With the preamble, the probability that the terminal conflicts with other terminals during random access decreases.

The foregoing describes the solutions of the embodiments of the present disclosure mainly from the perspective of interactions between respective network elements. It can be understood that the terminal and the network side device include corresponding hardware structures and/or software modules for performing the respective functions in order to implement the above functions. Those skilled in the art will readily appreciate that the present disclosure can be implemented in a form of hardware or a combination of hardware and computer software in combination with the elements and algorithm steps of the various examples described in the embodiments disclosed herein. Whether a function is implemented by means of hardware or software for driving hardware depends on the specific applications and design constraints. A person skilled in the art can use different methods for implementing the described functions for each particular application, but such implementation should not be considered to be beyond the scope of the present disclosure.

In the embodiments of the present disclosure, division of functional units is possible for the terminal and the network side device according to the method embodiments. For example, functional units may be divided according to functions, or two or more functions may be integrated into one processing unit. The integrated unit can be implemented in the form of hardware or in the form of a software functional unit. It should be noted that the division of the units in the embodiments of the present disclosure is illustrative, and is only a logical function division. In actual implementations, there may be other division manners.

Figure 6A:
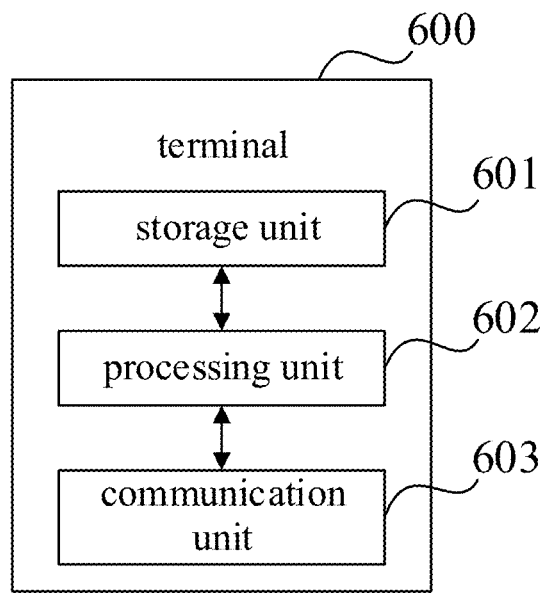
FIG. 6A is a schematic structural diagram of a terminal according to an embodiment of the present disclosure.

In the case of employing an integrated unit, FIG. 6A shows a possible structural diagram of the first core network device involved in the above embodiments. The terminal 600 includes a processing unit 602 and a communication unit 603. The processing unit 602 is configured to control and manage the actions of the terminal. For example, the processing unit 602 is configured to support the terminal to perform steps 501/502/503 in FIG. 5 and/or other processes for realizing the techniques described herein. The communication unit 603 is configured to support the terminal to perform communications with other devices, such as communications with the network side device shown in FIG. 4. The terminal may further include a storage unit 601 configured to store program codes and data of the terminal.

The processing unit 602 may be a processor or a controller, and may be, for example, a central processing unit (CPU), a general-purpose processor, a digital signal processor (DSP), an application-specific integrated circuit (ASIC), field programmable gate array (FPGA) or other programmable logic device, transistor logic device, hardware component, or any combination thereof. It is possible for the processing unit 602 to implement or carry out the various illustrative logical blocks, modules and circuits described in connection with the present disclosure. The processor may also be a combination realizing computing functions, such as a combination of one or more microprocessors, a combination of a DSP and a microprocessor, and the like. The communication unit 603 may be a transceiver, a transceiver circuit, or the like. The storage unit 601 may be a memory.

The processing unit 602 is configured to: when a Time Alignment Timer TAT corresponding to a first Timing Advance adjustment Group TAG fails, request by the communication unit 603 a serving cell corresponding to a second TAG to coordinate uplink timing of a serving cell corresponding to the first TAG; receive by the communication unit 603 a Timing Advance Command TAC corresponding to the first TAG; and adjust the uplink timing of the serving cell corresponding to the failed first TAG according to the TAC corresponding to the first TAG.

In a possible example, the second TAG is a TAG of a first Media Access Control MAC entity to which the first TAG belongs; a serving cell set corresponding to the first TAG and a serving cell set corresponding to the second TAG transmit data to the terminal by means of carrier aggregation CA; the first TAG and the second TAG are managed by the first Media Access Control MAC entity, and a TAG ID of the first TAG and a TAG ID of the second TAG are allocated by the first MAC entity.

In a possible example, the second TAG is a TAG of a second MAC entity, and the second MAC entity is different from the first MAC entity to which the first TAG belongs; a serving cell set corresponding to the first TAG and a serving cell set corresponding to the second TAG transmit data to the terminal by means of dual connectivity DC, the first TAG is managed by the first MAC entity, and the second TAG is managed by the second MAC entity; the TAG ID of the first TAG is allocated by the first MAC entity, and the TAG ID of the second TAG is allocated by the second MAC entity; each of the first MAC entity and the second MAC entity corresponds to multiple TAGs, and the multiple TAGS include one pTAG or one pTAG and at least one sTAG.

In one possible example, the processing unit 602 is further configured to trigger a TAT of the first TAG.

In a possible example, the processing unit 602 is specifically configured to send an alignment command for coordinating uplink timing to the serving cell corresponding to the second TAG in the aspect of requesting the serving cell corresponding to the second TAG to coordinate uplink timing of the serving cell corresponding to the first TAG.

In one possible example, after the processing unit 602 sends the alignment command for coordinating uplink timing to the serving cell corresponding to the second TAG by the communication unit 603, the processing unit is further configured to receive by the communication unit 603 a random access preamble allocated by the serving cell corresponding to the second TAG; wherein the random access preamble is allocated after the serving cell corresponding to the second TAG receives the alignment command for coordinating uplink timing.

In a possible example, after the processing unit 602 receives by the communication unit 603 the random access preamble allocated by the serving cell corresponding to the second TAG, the processing unit 602 is further configured to initiate a random access procedure by using the random access preamble and receive by the communication unit 603 a random access response sent by the serving cell corresponding to the first TAG and obtain an uplink timing adjustment amount.

Figure 6B:
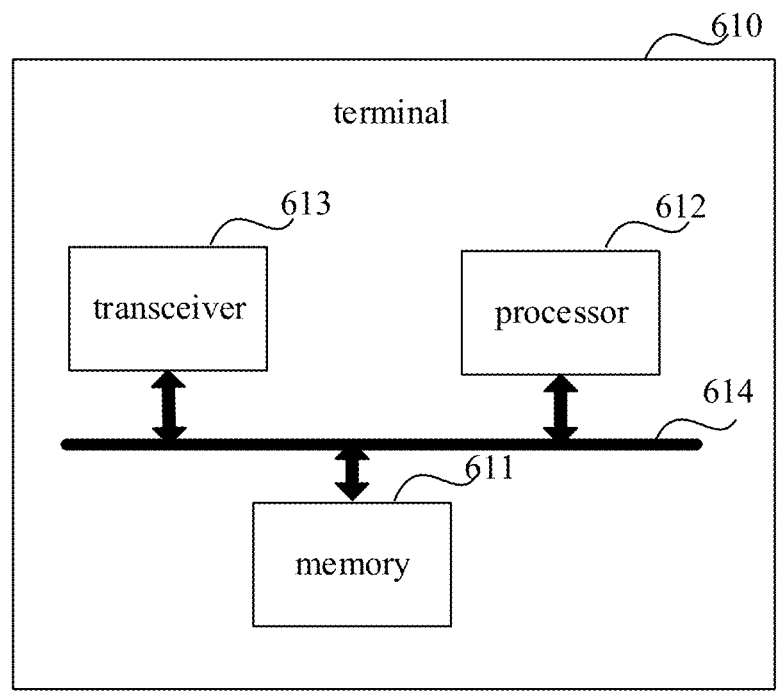
FIG. 6B is a schematic structural diagram of another terminal according to an embodiment of the present disclosure.

When the processing unit 602 is a processor, the communication unit 603 is a communication interface, and the storage unit 601 is a memory, the terminal involved in the embodiments of the present disclosure may be the terminal shown in FIG. 6B.

Referring to FIG. 6B, the terminal 610 includes a processor 612, a communication interface 613, and a memory 611. Optionally, the terminal 610 may further include a bus 614. The communication interface 613, the processor 612, and the memory 611 may be connected to each other through the bus 614. The bus 614 may be a peripheral component interconnect (PCI) bus or an extended industry standard architecture (EISA) bus, etc. The bus 614 can be divided into an address bus, a data bus, a control bus, and the like. For ease of representation, only one thick line is shown in FIG. 6B, but it does not mean that there is only one bus or one type of bus.

The terminal shown in FIG. 6A or FIG. 6B can also be understood as a device used for a terminal, which is not limited in the embodiments of the present disclosure.

Figure 7:
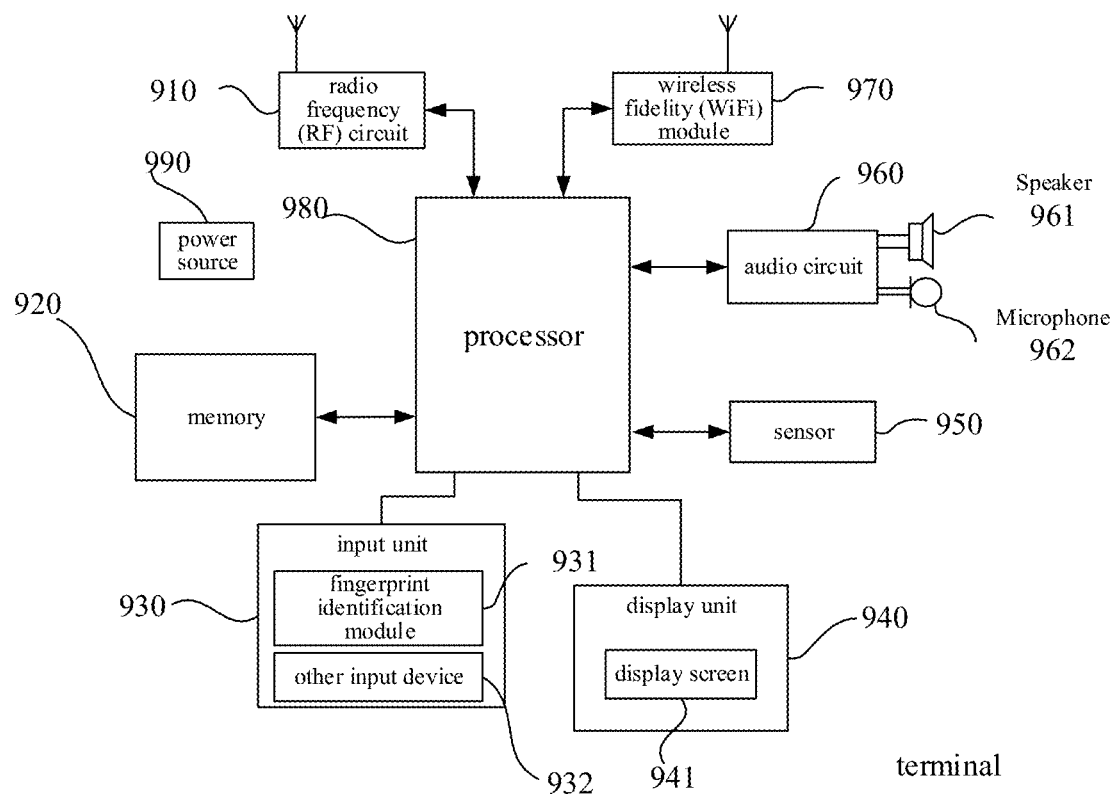
FIG. 7 is a schematic structural diagram of another terminal according to an embodiment of the present disclosure.

An embodiment of the present disclosure further provides another terminal, as shown in FIG. 7. For the convenience of description, only the parts related to the embodiments of the present disclosure are shown. Specific technical details may be found in the description regarding the method embodiments of the present disclosure. The terminal can be any terminal device including a mobile phone, a tablet computer, a PDA (Personal Digital Assistant), a POS (Point of Sales), an in-vehicle computer. In the descriptions below, for example, the terminal is a mobile phone.

FIG. 7 is a block diagram showing a partial structure of a mobile phone related to a terminal according to an embodiment of the present disclosure. Referring to FIG. 7, the mobile phone includes: a radio frequency (RF) circuit 910, a memory 920, an input unit 930, a display unit 940, a sensor 950, an audio circuit 960, a wireless fidelity (WiFi) module 970, a processor 980, a power source 990 and other components. It will be understood by those skilled in the art that the structure of the mobile phone shown in FIG. 7 does not constitute a limitation to the mobile phone, and may include more or less components than those illustrated, or some components may be combined, or different components may be arranged.

The components of the mobile phone will be described below in detail with reference to FIG. 7.

The RF circuit 910 can be configured to receive and transmit information. Generally, RF circuit 910 includes, but is not limited to, an antenna, at least one amplifier, a transceiver, a coupler, a low noise amplifier (LNA), a duplexer, and the like. In addition, the RF circuitry 910 can also communicate with networks and other devices via wireless communication. The above wireless communication may use any communication standard or protocol, including but not limited to global system of mobile communication (GSM), general packet radio service (GPRS), code division multiple access (CDMA), wideband code division multiple access (WCDMA), long term evolution (LTE), E-mail, short messaging service (SMS), and the like.

The memory 920 can be configured to store software programs and modules, and the processor 980 executes various functional applications and data processing of the mobile phone by running software programs and modules stored in the memory 920. The memory 920 may mainly include a program storage area and a data storage area, wherein the program storage area may store an operating system, at least one application required for a function, and the like; the data storage area may store data created according to use of the mobile phone, and the like. Moreover, the memory 920 can include high speed random access memory, and can also include non-volatile memory, such as at least one of magnetic disk storage device, flash device, or other volatile solid state storage device.

The input unit 930 can be configured to receive input numeric or character information and to generate key signal inputs related to user settings and function controls of the mobile phone. Specifically, the input unit 930 can include a fingerprint identification module 931 and other input devices 932. The fingerprint identification module 931 can collect fingerprint data of users thereon. In addition to the fingerprint identification module 931, the input unit 930 may also include other input devices 932. Specifically, other input devices 932 may include, but are not limited to, one or more of a touch screen, a physical keyboard, function keys (such as volume control buttons, switch buttons, etc.), trackballs, mouse, joysticks, and the like.

The display unit 940 can be configured to display information input by the user or information provided to the user as well as various menus of the mobile phone. The display unit 940 can include a display screen 941. Alternatively, the display screen 941 can be configured in the form of a liquid crystal display (LCD), an organic light-emitting diode (OLED), or the like. Although the fingerprint identification module 931 and the display screen 941 are shown as two separate components to implement the input and display functions of the mobile phone in FIG. 7, the fingerprint identification module 931 and the display screen 941 may be integrated to achieve the input and play functions of the mobile phone in some embodiments.

The mobile phone may also include at least one type of sensor 950, such as a light sensor, motion sensor, and other sensors. Specifically, the light sensor may include an ambient light sensor and a proximity sensor. The ambient light sensor may adjust the brightness of the display screen 941 according to the brightness of the ambient light, and the proximity sensor may turn off the display screen 941 or backlight when the mobile phone moves to user's ear. As a kind of motion sensor, an accelerometer sensor can detect acceleration of each direction (usually three axes), and a magnitude and direction of gravity at rest. The accelerometer sensor can be configured to identify the gesture of the mobile phone (such as horizontal and vertical screen switching, related games, magnetometer gesture calibration), and recognize vibration-related functions (such as pedometer, tapping), etc. Other sensors such as gyroscopes, barometers, hygrometers, thermometers, infrared sensors, etc. can be configured on the mobile phone, which will not be described here.

An audio circuit 960, a speaker 961, and a microphone 962 can provide an audio interface between a user and the mobile phone. The audio circuit 960 can transmit the converted electrical data of the received audio data to the speaker 961 which converts the signal into sound signal for play. On the other hand, the microphone 962 converts the collected sound signal into an electrical signal which is converted into audio data after revived by the audio circuit 960. Then the audio data is processed by the processor 980; after the processing, the audio data is sent to another the mobile phone via RF circuit 910 or is stored to the memory 920 for further processing.

WiFi is a short-range wireless transmission technology, and the mobile phone can help users send and receive emails, browse web pages, and access streaming media through the WiFi module 970. The WiFi technology provides users with wireless broadband Internet access. Although FIG. 7 shows the WiFi module 970, it can be understood that it does not belong to a necessary part of the mobile phone, and can be omitted as needed and such omission is within the scope of the present disclosure without changing the essence of the present disclosure.

The processor 980 is the control center of the mobile phone, which is connected to various portions of the entire the mobile phone using various interfaces and lines, and monitors overall operation of the mobile phone by running or executing software programs and/or modules stored in the memory 920, calling data stored in the memory 920, executing various functions of the mobile phone and processing data. Optionally, the processor 980 may include one or more processing units; preferably, the processor 980 may be integrated with an application processor and a modem processor. The application processor mainly processes the operating system, a user interface, applications, and the like; the modem processor mainly processes wireless communications. It will be appreciated that the above described modem processor may also not be integrated into the processor 980.

The mobile phone also includes a power source 990 (such as a battery) that supply power to the various components. Preferably, the power source can be logically coupled to the processor 980 via a power management system to realize to management of charging, discharging, and power consumption management functions through the power management system.

Although not shown, the mobile phone may further include a camera, a Bluetooth module, and the like, and details are not described herein.

In the foregoing embodiment shown in FIG. 5, the processes on the terminal side in the method embodiments may be implemented based on the structure of the mobile phone.

In the foregoing embodiments shown in FIG. 6A and FIG. 6B, each unit function can be implemented based on the structure of the mobile phone.

The steps of the methods or algorithms described in the embodiments of the present disclosure may be implemented in a form of hardware, or may be implemented by a processor executing software instructions. The software instructions may be composed of corresponding software modules, which may be stored in a random access memory (RAM), a flash memory, a read only memory (ROM), an erasable programmable read only memory (Erasable Programmable ROM (EPROM), an electrically erasable programmable read only memory (EEPROM), registers, hard disk, removable hard disk, compact disk read only (CD-ROM) or any other form of storage medium known in the art. An exemplary storage medium is coupled to the processor to enable the processor to read information from, and write information to, the storage medium. Of course, the storage medium can also be a part of the processor. The processor and the storage medium can be located in an ASIC. Additionally, the ASIC can be located in an access network device, a target network device, or a core network device. Of course, the processor and the storage medium may also exist as discrete components in the access network device, the target network device, or the core network device.

Those skilled in the art should appreciate that in one or more of the above examples, the functions described in the embodiments of the present disclosure may be implemented in whole or in part by software, hardware, firmware, or any combination thereof. When implemented in software, all or a part of the functions may be implemented in the form of a computer program product. The computer program product includes one or more computer instructions. When the computer program instructions are loaded and executed on a computer, the processes or functions described in accordance with embodiments of the present disclosure are generated in whole or in part. The computer can be a general purpose computer, a special purpose computer, a computer network, or other programmable devices. The computer instructions can be stored in a computer readable storage medium or transmitted from one computer readable storage medium to another computer readable storage medium. For example, the computer instructions can be transmitted from a website, a computer, a server or a data center to another website, computer, server, or data center via wires (e.g., coaxial cable, fiber optic, digital subscriber line (DSL)) or wirelessly (e.g., infrared, wireless, microwave, etc.). The computer readable storage medium can be any available medium that can be accessed by a computer or a data storage device such as a server, a data center, or the like that includes one or more available mediums. The available medium may be a magnetic medium (such as, a floppy disk, a hard disk, a magnetic tape), an optical medium (such as, a digital video disc (DVD)), or a semiconductor medium (such as, a solid state disk (SSD)) or the like.

The specific embodiments described above further explain the objectives, technical solutions and beneficial effects of the embodiments of the present disclosure. It should be understood that the above description is only exemplary embodiments of the present disclosure, and is not intended to limit the protection scope of the present disclosure. Any modifications, equivalent substitutions, improvements, etc., which are made on the basis of the technical solutions of the embodiments of the present disclosure, should be included in the protection scope of the embodiments of the present disclosure.

What is claimed is:

1. An uplink timing adjustment method, comprising:
when a Time Alignment Timer TAT corresponding to a first Timing Advance adjustment Group TAG fails, requesting, by a terminal, a serving cell corresponding to a second TAG to coordinate uplink timing of a serving cell corresponding to the first TAG;
receiving, by the terminal, a Timing Advance Command TAC corresponding to the first TAG; and
adjusting, by the terminal, the uplink timing of the serving cell corresponding to the failed first TAG according to an uplink timing adjustment amount in the TAC corresponding to the first TAG.

2. The method according to claim 1, wherein: the second TAG is a TAG of a first Media Access Control MAC entity to which the first TAG belongs; a serving cell set corresponding to the first TAG and a serving cell set corresponding to the second TAG transmit data to the terminal by means of carrier aggregation CA; the first TAG and the second TAG are managed by the first Media Access Control MAC entity, and a TAG ID of the first TAG and a TAG ID of the second TAG are allocated by the first MAC entity.

3. The method according to claim 1, wherein: the second TAG is a TAG of a second MAC entity, and the second MAC entity is different from the first MAC entity to which the first TAG belongs; a serving cell set corresponding to the first TAG and a serving cell set corresponding to the second TAG transmit data to the terminal by means of dual connectivity DC, the first TAG is managed by the first MAC entity, and the second TAG is managed by the second MAC entity; the TAG ID of the first TAG is allocated by the first MAC entity, and the TAG ID of the second TAG is allocated by the second MAC entity; each of the first MAC entity and the second MAC entity corresponds to multiple TAGs, and the multiple TAGs comprise one pTAG or one pTAG and at least one sTAG.

4. The method according to claim 1, wherein the method further comprises:
triggering the TAT of the first TAG by the terminal.

5. The method according to claim 1, wherein requesting, by the terminal, the serving cell corresponding to the second TAG to coordinate uplink timing of the serving cell corresponding to the first TAG comprises:
sending, by the terminal, an alignment command for coordinating uplink timing to the serving cell corresponding to the second TAG.

6. The method according to claim 5, wherein after the terminal sends alignment command for coordinating uplink timing to the serving cell corresponding to the second TAG, the method further comprises:

receiving, by the terminal, a random access preamble allocated by the serving cell corresponding to the second TAG; wherein the random access preamble is allocated after the serving cell corresponding to the second TAG receives the alignment command for coordinating uplink timing.

7. The method according to claim 6, wherein after the terminal receives the random access preamble allocated by the serving cell corresponding to the second TAG, the method further comprises:

initiating, by the terminal, a random access procedure by using the random access preamble; and receiving, by the terminal, a random access response sent by the serving cell corresponding to the first TAG and obtaining an uplink timing adjustment amount.

8. A terminal, comprising:

a processor and a transceiver and a memory, wherein the processor is communicatively coupled to the memory and the transceiver, the memory stores program codes and data, and the processor is configured to call the program codes and the data in the memory to perform:

when a Time Alignment Timer TAT corresponding to a first Timing Advance adjustment Group TAG fails, request a serving cell corresponding to a second TAG to coordinate uplink timing of a serving cell corresponding to the first TAG; receive by the transceiver a Timing Advance Command TAC corresponding to the first TAG; and adjust the uplink timing of the serving cell corresponding to the failed first TAG according to an uplink timing adjustment amount in the TAC corresponding to the first TAG.

9. The terminal according to claim 8, wherein: the second TAG is a TAG of a first Media Access Control MAC entity to which the first TAG belongs; a serving cell set corresponding to the first TAG and a serving cell set corresponding to the second TAG transmit data to the terminal by means of carrier aggregation CA; the first TAG and the second TAG are managed by the first Media Access Control MAC entity, and a TAG ID of the first TAG and a TAG ID of the second TAG are allocated by the first MAC entity.

10. The terminal according to claim 8, wherein: the second TAG is a TAG of a second MAC entity, and the second MAC entity is different from the first MAC entity to which the first TAG belongs; a serving cell set corresponding to the first TAG and a serving cell set corresponding to the second TAG transmit data to the terminal by means of dual connectivity DC, the first TAG is managed by the first MAC entity, and the second TAG is managed by the second MAC entity; the TAG ID of the first TAG is allocated by the first MAC entity, and the TAG ID of the second TAG is allocated by the second MAC entity; each of the first MAC entity and the second MAC entity corresponds to multiple TAGs, and the multiple TAGs comprise one pTAG or one pTAG and at least one sTAG.

11. The terminal according to claim 8, wherein the processor is further configured to trigger the TAT of the first TAG.

12. The terminal according to claim 8, wherein the processor is configured to send an alignment command for coordinating uplink timing to the serving cell corresponding to the second TAG in the aspect of requesting the serving cell corresponding to the second TAG to coordinate uplink timing of the serving cell corresponding to the first TAG.

13. The terminal according to claim 12, wherein after the processor sends the alignment command for coordinating uplink timing to the serving cell corresponding to the second TAG by the transceiver, the processor is further configured to receive by the transceiver a random access preamble allocated by the serving cell corresponding to the second TAG; wherein the random access preamble is allocated after the serving cell corresponding to the second TAG receives the alignment command for coordinating uplink timing.

14. The terminal according to claim 13, wherein after the processor receives by the transceiver the random access preamble allocated by the serving cell corresponding to the second TAG, the processor is further configured to initiate a random access procedure by using the random access preamble and receive by the transceiver a random access response sent by the serving cell corresponding to the first TAG and obtain an uplink timing adjustment amount.

\* \* \* \* \*